Nov. 1, 1932.  A. D. GARRISON  1,886,003
AUTOMOBILE TRANSMISSION
Filed Dec. 14, 1931
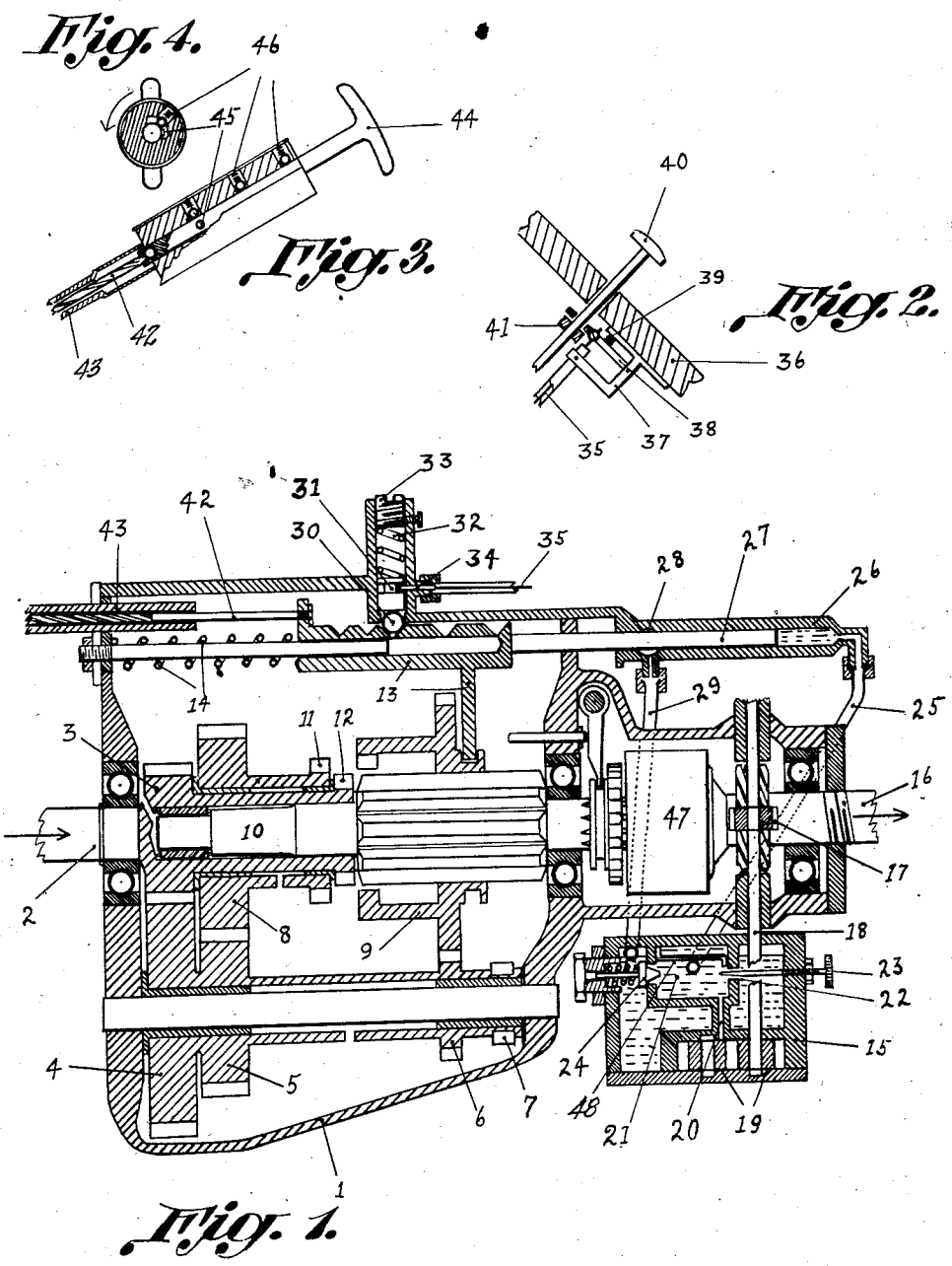
Inventor:
Allen Darnaby Garrison Patented Nov. 1, 1932

1,886,003

UNITED STATES PATENT OFFICE

ALLEN DARNABY GARRISON, OF HOUSTON, TEXAS

AUTOMOBILE TRANSMISSION

Application filed December 14, 1931. Serial No. 580,830.

My invention relates to the gear changing mechanism of an automobile, and the purposes of my improvements are: first, to provide a mechanism by which the gears may be shifted automatically; second, to effect this automatic gear shift at predetermined and easily adjustable automobile speeds; third, to perform these operations quietly and easily, by a device which is so simple and reliable that the entire operation of the automobile may be made less complicated, and safer.

I attain these objects by the mechanism illustrated in the accompanying drawing, in which—

Figure 1 is a section of the transmission mechanism; Figure 2 is a section of the means of control from the accelerator pedal of the automobile; Figure 3 and Figure 4 are sections of the manual control mechanism.

(1) is the transmission case which forms the support for the gear-change mechanism and its lubricant. (2) is the shaft to which power is supplied from the motor and (10) and (16) are the shafts through which the power is supplied to the wheels of the vehicle. A countershaft drive gear (3) meshes with the main gear on the countershaft (4) and drives the countershaft which carries the second-speed countershaft gear (5), the first-speed countershaft gear (6) and the reverse countershaft gear (7). The second-speed main-shaft gear (8) runs freely on bushings on the main shaft and is in constant mesh with the gear (5).

The sliding gear (9) is splined to the shaft (10), and in the drawing is in mesh with the first-speed countershaft gear (6), but it may be moved by the gear-shift member (13), either backward through a position of neutrality to a point where it meshes with the reverse gear which is not shown, but situated just back of the reverse countershaft gear (7) and in constant mesh with it; or the gear (9) may be shifted forward through a position of neutrality to the point where the ring gear on the forward portion of member (9) engages the clutch member (11) on the rear portion of the second-speed main-shaft gear (8); or the member (9) may be moved still farther forward through a position of neutrality to the point where the member engages the clutch member (12) on the main driving shaft the teeth of the clutch member (12) just coinciding with the splines on the shaft (10).

The gear-shift member (13) is capable of sliding backward or forward to effect the motion of the gear member (9), and the spring or constraining means (14) exerts a constraining force on the gear-shift member tending to hold it in such a position that the gear member (9) is in the neutral position between the first and reverse gears.

The function of shifting the gears is performed by an hydraulic pump which exerts a pressure on the end of the rod (27) and opposite in direction to the force of the spring (14). (15) is a section of the case of the liquid pump. The pump is driven from the power-delivery shaft (16) through the worm and gear (17) and the vertical shaft (18).

The pump I prefer to use in illustrating my device is the simple gear type, in which (19) represent the gears in mesh, (20) the delivery tube through which the liquid in the case is delivered at high pressure to the space (21) from which it can escape back to the main body of liquid in the case by two paths: namely, by the orifice (22) or by the valve (24). The orifice (22) may be changed in size by the needle and adjustable screw (23); while the valve (24) may be adjusted to open at any predetermined pressure. Thus, irrespective of the speed which the shaft (16) may attain, the pressure in the pump will never exceed that necessary for the operation of the gear-shift mechanism. At speeds below that necessary to open the valve (24), the pressure of the liquid in the pump compartment (21) will vary with the speed and with the setting of the needle (23).

The hydrostatic pressure is conveyed through the pipe (25) to the cylinder (26) and the rod (27) to the gear-shift member (13) of which the rod (27) is a part. Any leakage of the liquid along the cylinder walls from (26) is caught in the space (28) and drained back to the pump case through the tube (29).

By the adjustment of the needle (23), the liquid pressure may be made to oppose the force from the spring (14) and maintain the position of the gear-shift member at any point between neutral and high or direct drive through first and second respectively, but since it is imperative that gears shall be completely meshed before power is applied, a stepwise motion of the gear shift members is attained as follows:

Notches or surface irregularities are cut in the gear-shift member (13) at positions corresponding to reverse, neutral, first, second, and direct drives respectively. A ball (30) (may be a roller or plunger) fits into the notches—in the diagram, the ball is resting in the notch corresponding to first speed—and is pressed down into the notch by the plunger (31) and the spring (32). The tension of the spring may be adjusted by the nut (33), and the plunger may be prevented from rising at all by the pin (34) which fits into a groove in the plunger when it is down. Thus when the pin (34) fits into the groove of the plunger (31), the ball (30) is held in the notch and prevents the motion of the gear-shift member. When the pin (34) is withdrawn from the groove, the plunger and ball are free to rise provided the force on the gear-shift member is sufficient to exert a force on the spring (32) and overcome it; if this is not the case, the gear-shift member will not move. The compression on the spring (32) may be so adjusted to the strength of spring (14) and the slope of the side of the notch in which the ball (30) rests that when a force is applied to the gear-shift member which is just sufficient to release the ball, that force is just sufficient to maintain the position of the gear-shift member at the next highest notch. Thus, for example, first speed will not be disengaged until the hydrostatic pressure from the pump is sufficient to completely engage second speed, and second speed will not be disengaged until the pressure is sufficient to completely engage the direct drive. But none of these changes will take place unless the pin (34) is withdrawn from the groove of the plunger (31).

The position of the pin (34) may be controlled by a manually operated device, but since automobile gears should be shifted only when power is not being delivered through the transmission, I prefer to operate the pin either by attaching it to the clutch throw-out of the automobile in such a manner that the pin is withdrawn only when the clutch is disengaged, or, better, to operate the pin from the accelerator or throttle of the motor in such a manner that the pin is withdrawn and the gears shifted only when the throttle is closed. This connection, as I prefer to use it, is illustrated in the drawing, in which—

(35) is a flexible cable by which the pin may be released; this flexible cable leads to the floor boards of the automobile (36) where the cable is attached to the lever (38) and the support (37). The lever (38) is normally held down in the position illustrated in the drawing, in which position the pin (34) engages the groove in the plunger (31). This position is obtained by the compression of the spring (39). The accelerator pedal (40) has its stem extending through a hole in the lever (38) and a collar (41) is fitted to the stem at such a position that it lifts the lever (38) just as the throttle closes. Thus the automatic gear-shift mechanism can operate only with the throttle in the closed position.

Since it is necessary to shift the gears from neutral to reverse, or from neutral to first speed while the automobile is standing still; and since it may be desirable to lock the transmission in one of the forward speeds until it is desired to release it, I provide the following mechanism:

The flexible cable control and rod (42) is attached to the gear-shift member (13) and leads through the cable sheath (43) to the handle (44) which may be located on the dash, on the steering post, or at any convenient place. The handle (44) is free to move up or down with the motions of the gear-shift member, or it may be locked in any of the forward speeds by turning the handle so that the pin (45) enters one of the recesses behind one of the ball-and-spring locks (46). With the pin turned into one of the recesses, the gear remains meshed at that speed until the handle is turned back and the gear-shift member released.

I prefer to use this automatic automobile transmission in conjunction with an over-running clutch or "free wheeling" unit which is indicated at (47). With the over-running clutch the operation of the transmission is simplified and in driving the automobile the following results may be attained:

The motor is started with the handle (44) in the neutral position. If one desires to reverse, the clutch is disengaged and the handle (44) pushed in to the reverse position where it will remain until pulled out. If one desires to start forward, the clutch is disengaged and the handle (44) pulled out to the first-speed position. The force of the spring (14) should not be enough to release the gear-shift member from this first-speed position, but if the handle (44) should be drawn too far, say to the second-speed notch or the direct drive notch, the spring (14) would immediately return the members to the first-speed position.

When the clutch is engaged and the automobile starts, the liquid pressure in the pump begins to oppose the action of the spring (14) and rises in proportion to the speed of the vehicle; but during the acceleration, the throttle pedal is depressed and thus the gears are locked in the first speed irrespective of the speed attained. When the throttle pedal is released, the motor idles and the over-running clutch permits the transmission gears to slow down to the speed of the idling motor. If during acceleration the automobile has attained a speed, let us say, of five miles per hour, the pressure in the pump is sufficient to release the ball (30) and, as stated above, will be sufficient to completely engage the second-speed gears. Below the five-miles-per-hour point, the pressure will be too low to release the ball and the first speed remains meshed. The exact speed for release would be adjustable at the valve needle (23).

The gear mechanism would not be released from the second-speed position until a speed of, say, ten to twelve miles per hour, above which speed the direct drive would mesh at any time the accelerator pedal is released. Above, say, twenty miles per hour, the valve (24) opens so that the liquid pressure would not reach excessive values at high speeds.

As the automobile is reduced in speed, the direct drive obtains until the accelerator pedal is released at a speed below, say, five miles per hour, where the spring (14) makes the ball unstable in the direct-drive notch and pushes the gear shift members to the second-speed position. Just before the automobile stops, the members return to the first-speed position for the subsequent start.

Thus, in combination with an over-running clutch, the gears shift automatically without attention merely on the release of the accelerator pedal. In the absence of an over-running clutch, or when the over-running clutch is locked out, it would be necessary to declutch to effect the automatic shift, since the strain on the gears would check their motion.

For the liquid in the hydraulic pump I prefer to use some substance combining some lubricating properties with relatively high viscosity and with as low temperature coefficient of viscosity as possible. Since, however, any liquid used for this purpose would have its viscosity reduced by increasing temperature, and since the adjustment of the speed-change mechanism will depend on the viscosity of the liquid, I provide the following mechanism:

A bi-metallic strip (48) is fastened by one end in the pump compartment (21) and carries on its free end a vane which partly closes the orifice (22) at the point where the needle (23) enters the opening. When the temperature falls and the viscosity of the liquid consequently rises, the vane is drawn away from the needle thus enlarging the orifice. When the temperature rises and the viscosity of the liquid consequently falls, the vane is moved by the bending of the bi-metallic element in the downward direction, and the orifice is made smaller to correspond with the reduced viscosity of the liquid. By a suitable adjustment of the shape of the vane and the orifice, the length and composition of the bimetallic (or multimetallic) element, and the combination of several elements and several orifices, the proper amount of compensation may be provided for the changing characteristics of the material to be pumped with changing temperature.

I am aware that my invention can be operated successfully with a pump of a conventional centrifugal design, or by a plunger pump, or a cylinder pump; therefore, in drafting my claims, I shall define the term "pump" to claim and include any well-known mechanical device for creating a difference of pressure in a plastic material, and I shall define and claim the term "plastic material" to include any substance, whether gas, liquid, or mixture of liquid and solid, whose shape is so easily molded that pressure is readily transmitted from one part of the material to another in all directions.

I claim:

1. In an automatic automobile transmission, means for transmitting power through a plurality of speed ratios, a movable shift member being instrumental in the change from one speed ratio to another, means constraining the said shift member toward the position where power is transmitted at low speed; means for effecting the motion of the said shift member to a position where power is transmitted at high speed comprising a plastic material, a pump, means for operating the pump and means communicative between the said plastic material and the said shift member; means for limiting the movement of the shift member to predetermined automobile speeds comprising a member having surface irregularities, an irregularity-engaging element, means engaging the said irregularity-engaging element with the said surface irregularities whereby movement of the said shift member can occur only by displacement of the said irregularity-engaging element, means for adjusting the force of engagement of the said irregularity-engaging element relative to the force of the said means constraining the shift member, and means for adjusting the pressure of the said plastic material relative to the speed of the automobile and relative to the force of the said means constraining the shift member whereby the pressure of the said plastic material which is just large enough to disengage the irregularity-engaging element is also just large enough to complete the movement of the shift member and to change the speed ratio at a predetermined automobile speed.

2. In an automatic automobile transmission, the combination of a driving shaft, a driven shaft, a countershaft, gear members disposed on the said shafts, a movable gear member disposed on one of the said shafts whereby the driving shaft engages the driven shaft through different gear members when the said movable gear member is moved to different positions, a gear-shift member engaging the said movable gear member, a spring exerting a force on the gear-shift member in the opposite direction from engagements which effect the highest speed ratio of driven shaft to driving shaft, a notch-engaging element, a spring constraining the notch-engaging element toward notches disposed on the movable gear-shift member whereby the notch-engaging element engages the notches when the said movable gear member is in positions engaging different speed ratios and whereby a substantial force is required to disengage the notch-engaging element, a pump, communicative means from the driven shaft to the pump, a plastic material disposed in the said pump, means for communicating a force from the plastic material to the said movable gear member, the said force varying with the speed of the driven element, tending to disengage the notch-engaging element and tending to displace the said movable gear member toward the engagements which effect the highest speed ratio of driven shaft to driving shaft, a locking element whereby the notch-engaging element is prevented from disengaging, and means for making the locking element inoperative at will.

3. The structure of claim (1) and a locking device comprising a member which in its normal position prevents the disengagement of the said irregularity engaging element and means for displacing the said member and making the locking device inoperative at will.

4. The structure of claim (2) and cooperative means between the accelerator pedal of the automobile and the said locking device whereby the depression of the accelerator pedal effects the engagement of the said member, and the release of the accelerator pedal effects the disengagement of the said member.

5. The structure of claim (2) and communicative means from the said locking element to the accelerator pedal of the automobile whereby the release of the accelerator pedal causes the locking element to become inoperative.

6. The structure of claim (1) and means for shifting and locking the said gear-shift member comprising a shaft, a handle on the shaft, a flexible cable attached to the shaft and to the gear-shift member, support for the shaft, a pin on the shaft adapted to engage recesses in the shaft support and to lock the handle when the pin is turned into one of the recesses.

7. The structure of claim (1) and a valve, and a valve spring, whereby the pressure of the said plastic material is prevented from exceeding a predetermined value substantially as described.

8. The structure of claim 1 and a member having an orifice through which the said plastic material may flow, a multimetallic strip capable of bending under the influence of changes in temperature disposed relative to the said orifice whereby the bending of the said multimetallic strip under the influence of changes in temperature alters the dimensions of the said orifice.

9. In an automatic automobile transmission, the combination with a speed-change mechanism of a plastic material, means for maintaining the said plastic material at pressures which change with changing automobile speeds, means for operating the speed-change mechanism of the automobile by the pressure of the said plastic material, a member having an orifice through which the said plastic material may flow, a multimetallic strip capable of bending under the influence of changes in temperature, said strip disposed relative to the said orifice whereby the bending of the said strip alters the dimensions of the said orifice.

ALLEN DARNABY GARRISON.

CERTIFICATE OF CORRECTION.

Patent No. 1,886,003. November 1, 1932.

ALLEN DARNABY GARRISON.

It is hereby certified that error appears in the printed specification of the above numbered patent requiring correction as follows: Page 4 line 42, claim 4, strike out the enclosed figure "(2)" and insert instead "(1) and a locking device comprising a member which in its normal position prevents the disengagement of the said irregularity-engaging element and means for displacing the said member and making the locking device inoperative at will,"; and that the said Letters Patent should be read with this correction therein that the same may conform to the record of the case in the Patent Office.

Signed and sealed this 3rd day of January, A. D. 1933.

(Seal)

M. J. Moore,
Acting Commissioner of Patents.